(No Model.)  3 Sheets—Sheet 1.

B. J. C. HOWE.
FIRE ENGINE.

No. 262,195. Patented Aug. 1, 1882.

Attest  
Sidney P. Hollingsworth  
Walter S. Dodge

Inventor.  
B. J. C. Howe,  
by Dodge & Son,  
Attys.

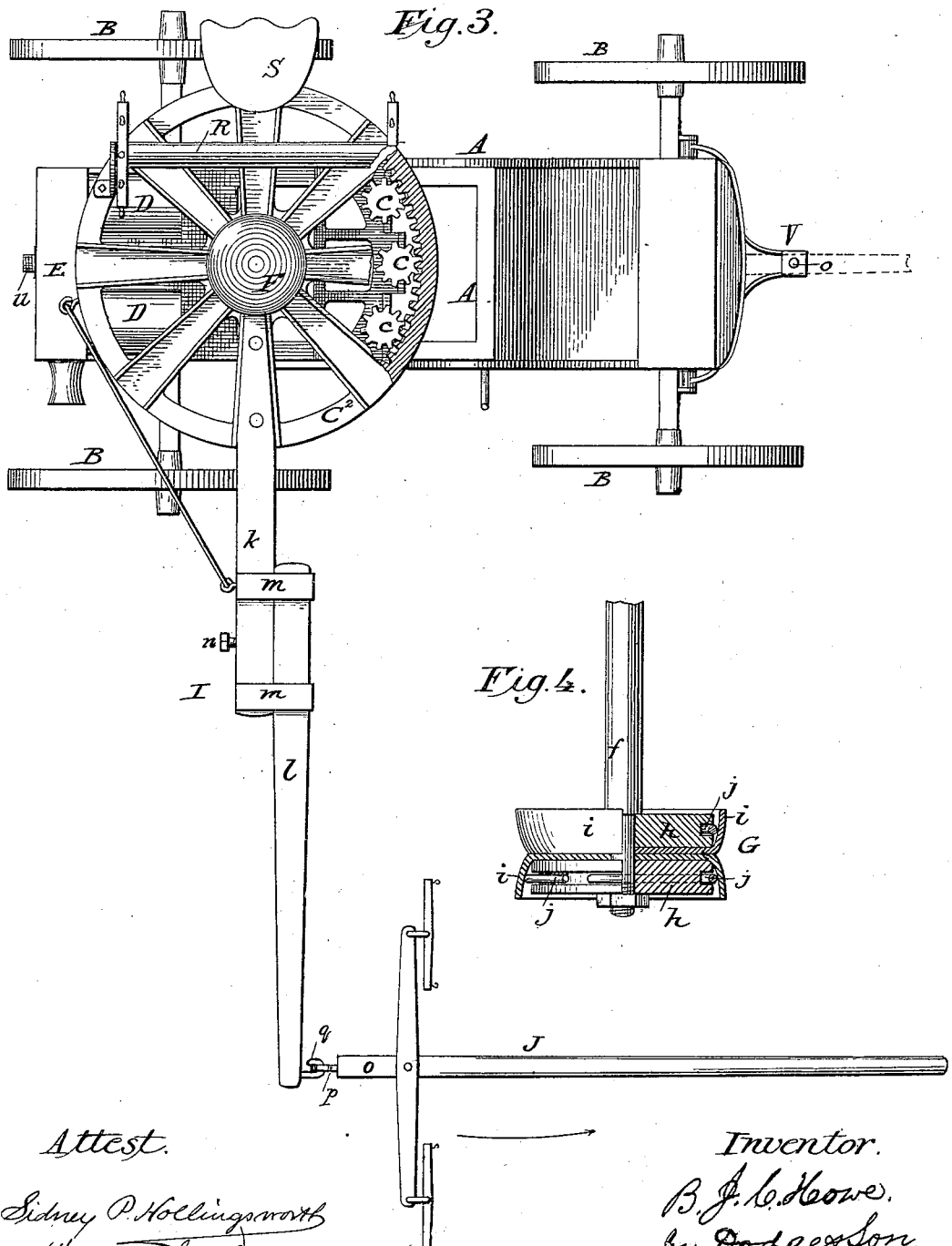

(No Model.) 3 Sheets—Sheet 3.
B. J. C. HOWE.
FIRE ENGINE.

No. 262,195. Patented Aug. 1, 1882.

Attest.
Sidney P. Hollingsworth
Walter S. Dodge.

Inventor.
B. J. C. Howe.
by Dodgerson
Attys

N. PETERS, Photo-Lithographer, Washington, D. C.

UNITED STATES PATENT OFFICE.

BENJAMIN J. C. HOWE, OF SYRACUSE, ASSIGNOR TO THE REMINGTON AGRICULTURAL COMPANY, OF ILION, NEW YORK.

FIRE-ENGINE.

SPECIFICATION forming part of Letters Patent No. 262,195, dated August 1, 1882.

Application filed April 24, 1882. (No model.)

*To all whom it may concern:*

Be it known that I, BENJAMIN J. C. HOWE, of Syracuse, in the county of Onondaga and State of New York, have invented certain Improvements in Fire-Engines, of which the following is a specification.

This invention relates to that class of fire-engines designed to be operated by animal power; and it consists in certain details of construction by which the apparatus as a whole is rendered far more complete and available, as hereinafter more fully set forth.

Figure 1:
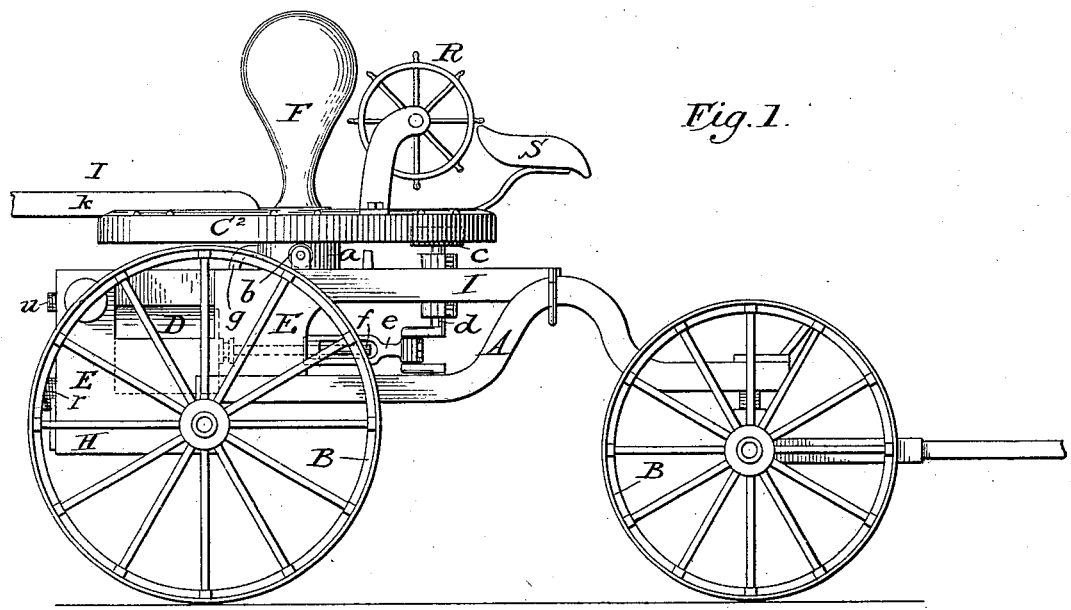
Figure 2:
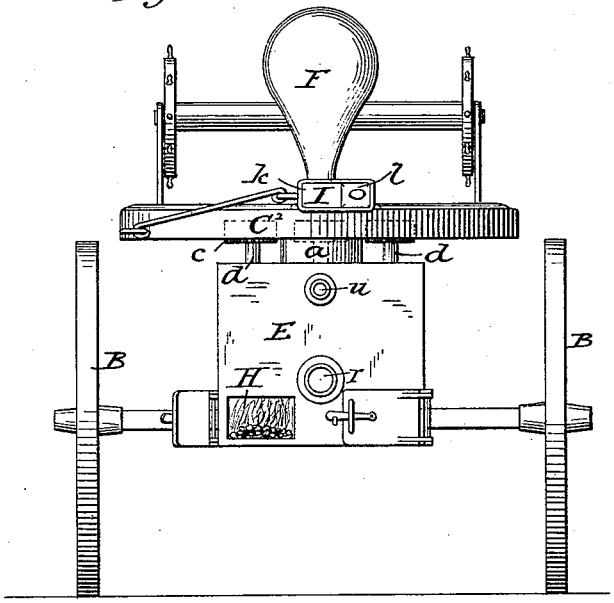

Figure 1 is a side elevation of the engine complete and ready for use. Fig. 2 is a rear end elevation. Fig. 3 is a top plan view. Fig. 4 is a side elevation of the pump-piston, shown partly in section; and Fig. 5 is a perspective view of the frame with the pumps and their driving-cranks and pinions in position, to more clearly illustrate the construction of the frame and the arrangement of the various parts.

Various attempts have been made from 1845 to the present time to produce a portable fire-engine to be operated by animal power, and that would be reliable in use, and so cheap as to be adapted for use in towns and villages where no regular fire-department existed; but while numerous patents have been granted for such devices, they have all, so far as I am aware, for one reason or another, failed to come into practical operation.

My present invention may be considered as an improvement on the fire-engine patented to me July 12, 1881, No. 244,131, the object in this case being to produce a complete working apparatus that can be manufactured and sold at a comparatively small price, so as to bring it within the reach of small villages, private establishments, or even thickly settled rural districts, and which at the same time shall be so constructed as to be strong and durable, ready for instant use, and not liable to get out of order or to be affected by extreme cold; and to this end my present invention consists mainly in the details of construction as hereinafter set forth.

Figure 5:
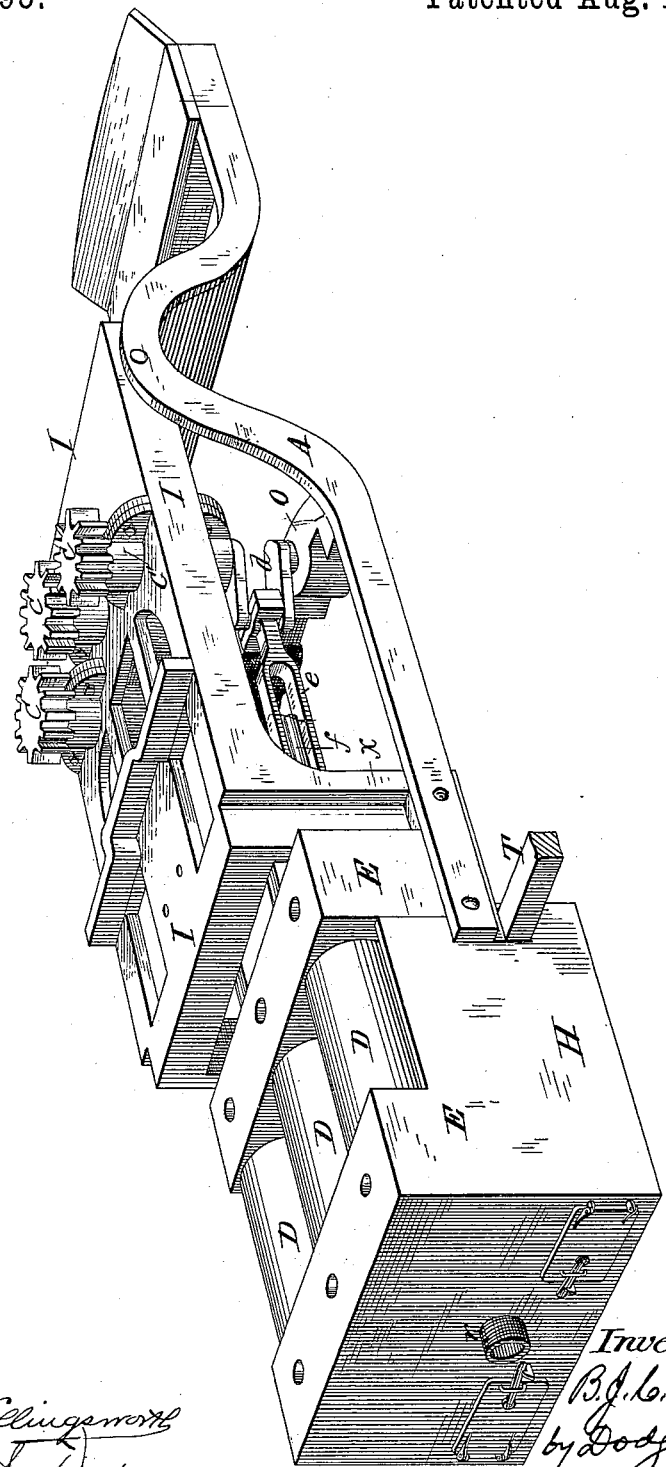

In order to render the apparatus strong, durable, and light, I construct the frame of metal, as shown in Figs. 1 and 5. This frame consists of two side bars, A, and a central frame or bed-piece, I, which latter may be cast in a single piece or be composed of wrought-metal bars bolted or riveted together, and to which the side bars, A, are securely fastened, so as to form a frame substantially such as is represented in Fig. 5.

It will be observed that the side bars, A, are curved near their front ends, so as to form what is termed a "cut under" for the front wheels to enter, thus enabling the engine to turn very short, so as to facilitate its movement and the more readily get it into any desired position.

The bars A are connected by suitable cross-pieces at their front end, and with a foot-board or platform for the driver, their rear ends extending to the rear axle, T, where they are securely bolted to the arms $x$ of the part I, and also to the water chamber or box E at the front end of the pump-cylinders D, as represented in Figs. 1 and 5, these cylinders and water-chambers E being constructed and arranged in relation to each other substantially as shown in my patent above mentioned.

In order, however, to give greater stability to the working parts, I arrange the pumps with their water-chambers directly over the rear axle, a preponderance of their weight being in rear of the axle, to counterbalance the part I and the driving-gear mounted thereon, as represented in Figs. 1, 2, and 3.

The pumps D, being thus located, have their piston-rods $f$ extended forward, as shown in Fig. 5, and are connected by a forked pitman, $e$, to vertical crank-shafts $d$, which have bearings at their lower ends in a cross-bar, O, which is firmly secured to the side bars, A, and above in boxes C', secured to the part I, these crank-shafts having each a pinion, C, secured to their upper ends, as clearly shown in Fig. 5, these pinions being arranged in the arc of a circle, so they may all gear into and be driven by a horizontally-rotating drive-wheel, $C^2$, mounted on the rear portion of the bed or frame I, as represented in Figs. 1, 2, and 3. By this arrangement of the pumps and their operating-cranks it will be seen a longer pitman can be used, whereby the lateral thrust upon the piston-rods will be lessened, and that the crank-rods, being supported at opposite sides of the cranks, will be held securely in position and will work with less friction and strain than when having a bearing at one point only, as was the case in my former patent.

The drive-wheel $C^2$ is internally geared, so it fits over and covers the outer face of the pinions C, as shown in Figs. 1 and 3, and it is mounted on a broad bearing boss or stud, $a$, secured firmly upon the rear part of the frame or bed I; and to give it still further support and steadiness its outer rim is supported on a series of rollers, $b$, located at suitable intervals in the line of its track. The boss or stud $a$ is made tubular, so as to connect with an air-chamber, F, which is bolted securely to its upper face, and which has a flange that projects laterally over the upper face of the hub of the drive-wheel $C^2$, thereby holding it in place. A pipe, $g$, Fig. 1, connects the water-chamber E of the pumps with the tubular boss $a$, and thereby with the air-chamber F, the air in the chamber F operating, as usual in such cases, by its elasticity to keep a constant pressure upon the water, and thus insure a steady stream, and at the same time prevent the concussion or shocks which would otherwise occur when reciprocating pumps are used.

To the drive-wheel $C^2$ a sweep or operating-lever is connected, as shown in Fig. 3, this sweep being made extensible by connecting its two parts, $k$ and $l$, by means of bands $m$, so that by removing the bolt $n$ or an equivalent fastening device the part $l$ can be adjusted to give any desired leverage when in operation, or can be shoved entirely back out of the way without detaching it, as may be desired when moving the engine about or putting it under cover, as it is designed to be when not in use.

In order to enable the engine to be operated by the team which hauls it, and to enable it to be more quickly put into operation when in position, I make the tongue J detachable, it being secured to the front axle by a socket, V, and a bolt, $o$, so that by merely withdrawing the bolt the team can be disconnected from the truck without unhitching the traces or any part of the harness. The tongue at its rear end is provided with an eye, $p$, as shown in Fig. 3, and the bar $l$ of the sweep is provided with a hook, $q$, so that the instant the tongue is disconnected from the truck it, with the team attached, can be instantly connected to the sweep and the pumps be set at work in the shortest possible time. This is a very important feature, inasmuch as it is well understood that a small quantity of water applied at the beginning of fire is more effective than a much larger quantity applied after the fire has acquired headway.

Any number of pumps may be used; but I have shown and prefer to use three, as by setting their cranks at different angles the strain or power is applied with greater uniformity, and I find in practice that with three pumps of proper size thus arranged a constant and steady stream of water can be thrown to a distance and with a force nearly or quite equal to that of the ordinary steam fire-engine. The pumps may be single or double acting; but I prefer to use the latter because more efficient.

To make a simple, cheap, and durable piston for the pumps, I construct it as shown in Fig. 4—that is to say, I provide two metallic disks, $h$, each having an annular groove in its periphery, in which I set a spring-cut ring, $j$, as shown. These two disks are secured upon the piston-rod $f$, and between them are placed two leather disks, $i$, of larger diameter, which have their projecting edges bent down over the springs $j$ and over the periphery of the disks $h$, thus forming a cup-shaped packing for each disk, the springs $j$ serving to keep the packing $i$ pressed outward against the sides of the cylinder, so that the water, pressing against the inner face of the leather $i$, will press it outward, and thus keep the piston packed just in proportion to the force applied. This constitutes a simple, cheap, and efficient device for the purpose intended. If it be designed for a single-acting pump, then but one leather disk will be required.

To prevent the cold from interfering with the operation of the engine, as there is danger of its doing at the North, especially in midwinter and at night, I provide a fire-chamber, and so locate it that the heat therefrom will keep the cylinders and water-chambers warm, and thus prevent the water from freezing therein or in the hose. In this case I have shown the fire-chamber H as located at the rear, under the pumps and the water-chambers, as the most convenient arrangement. This fire-chamber may be provided with a grate for burning wood or coal to suit different localities, or it may be provided with coal-oil or similar heaters, as may be preferred.

As shown in Figs. 1 and 3, a hose-reel, R, and a driver's seat, S, are mounted on the drive-wheel $C^2$, the seat being located at the side opposite the sweep $k$, so that when the sweep is arranged to project at the rear, as it will be when going to or from a fire, the seat S will be at the front, as shown in Fig. 1, in proper position for the driver to manage the team. If desired, this seat may be pivoted, so that the driver may turn in proper position to see and manage the team while operating the pumps. The suction-hose for supplying the pumps will be connected to the tube $r$, and the delivery-hose will be connected to the tube $u$, said tubes being shown in Figs. 1 and 2.

By the arrangement of the pumps and their operating mechanism, as shown, it will be seen that all the parts are readily accessible, and at the same time the pumps and operating parts are so located and balanced upon the rear axle as to give them a firm support and prevent that jarring, springing, and shaking that necessarily occur when these parts are hung or mounted between the front and rear wheels, as has generally been proposed heretofore.

By these several improvements I am enabled to produce an engine at once compact, strong, and durable, and that is well adapted for use in localities where it has not hitherto been customary to have fire-engines, and which is also adapted to supplant the inefficient hand fire-engines still used in some localities.

Having thus described my invention, what I claim is—

1. The herein-described frame for a fire-engine, consisting of the side bars, A, curved near the front, so as to permit the front wheels to turn under them, and the bed or horizontal frame I for supporting the operating mechanism, the said parts being constructed and arranged substantially as shown and described.

2. In combination with the frame, constructed as set forth, the double-crank shafts $d$, having bearings at opposite sides of their cranks and provided with pinions C at their upper ends, said crank-shafts with their pinions being arranged in the arc of a circle to engage with the driving-wheel $C^2$, substantially as shown and described.

3. The combination, in a fire-engine, of a horizontal rotary gear-wheel mounted upon the frame of the engine, a series of pumps located at the rear end of the frame, and a series of pinions meshing with the gear-wheel at its opposite side, and secured upon crank-shafts connected with the pump-pistons by pitmen extending backward beneath the gear-wheel, substantially as shown.

4. In a fire-engine, the combination, with the pump-cylinder, of a heater arranged to protect the apparatus from the effects of cold, substantially as described.

5. In combination with a fire-engine provided with a horizontal drive-wheel, an extensible sweep constructed to operate substantially as described, whereby the leverage can be changed at will and the sweep shortened or doubled up when not in use, substantially as set forth.

6. In a fire-engine, a detachable tongue provided with means for connecting it with the operating lever or sweep, whereby the team can be changed from hauling to operating the engine without detaching it from the tongue.

7. In a fire-engine, the horizontal driving-wheel $C^2$, provided with a sweep located at one side and a seat located at the opposite side, whereby the seat is brought into proper position for the driver when the sweep is arranged longitudinally of the engine, as set forth.

8. The seat S, pivoted upon the drive-wheel $C^2$, whereby the driver is enabled to change his position so as to adapt it to the team, whether hauling the engine or operating the pumps, as described.

BENJAMIN J. C. HOWE.

Witnesses:
 WALTER S. DODGE,
 WILLIAM W. DODGE.